United States Patent
Bedekar et al.

(10) Patent No.: US 10,362,632 B2
(45) Date of Patent: Jul. 23, 2019

(54) ARCHITECTURE FOR RADIO ACCESS NETWORK AND EVOLVED PACKET CORE

(71) Applicant: NOKIA SOLUTIONS AND NETWORKS OY, Espoo (FI)

(72) Inventors: Anand Bedekar, Arlington Heights, IL (US); Rajeev Agrawal, Glenview, IL (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 14/303,031

(22) Filed: Jun. 12, 2014

(65) Prior Publication Data

US 2015/0366000 A1 Dec. 17, 2015

(51) Int. Cl.
*H04W 76/16* (2018.01)
*H04W 84/04* (2009.01)
(Continued)

(52) U.S. Cl.
CPC ......... *H04W 84/042* (2013.01); *H04W 24/02* (2013.01); *H04W 76/16* (2018.02);
(Continued)

(58) Field of Classification Search
CPC ... H04W 36/16; H04W 36/165; H04W 88/12; H04W 8/082; H04W 36/08; H04W 92/045; H02W 76/16
See application file for complete search history.

(56) References Cited

U.S. PATENT DOCUMENTS

2010/0061301 A1 3/2010 Antal et al.
2013/0142166 A1 6/2013 Bogineni et al.
(Continued)

OTHER PUBLICATIONS

MEVICO (Mobile Networks Evolution for Individual Communications Experience), Advanced EPC architecture for smart traffic steering, CELTIC / CP7-011, Document D2.1, Version 1.2, Nov. 14, 2011, 63 pages.

(Continued)

*Primary Examiner* — Jae Y Lee
*Assistant Examiner* — Aixa A Guadalupe Cruz
(74) *Attorney, Agent, or Firm* — Squire Patton Boggs (US) LLP

(57) ABSTRACT

As radio access network (RAN) architecture evolves and evolved packet core deployments get more distributed, there is an opportunity to provide significant optimizations of latency and processing. Certain embodiments can provide these and other benefits using vertical aggregation of radio access network and evolved packet core functionalities. A method can include operating a network element as a per-user-equipment control plane entity. The method can also include operating the network element as a first user plane entity (for example, a per-user-equipment user plane entity). The method can further include operating the network element as a second user plane entity. The method can additionally include operating the network element as a per-cell control plane entity. The method can also include operationally interconnecting the per-user-equipment control plane entity, the first user plane entity, the second user plane entity, and the per-cell control plane entity via interfaces.

20 Claims, 5 Drawing Sheets

(51) Int. Cl.
    *H04W 24/02*     (2009.01)
    *H04W 88/08*     (2009.01)
    *H04W 88/12*     (2009.01)
    *H04W 88/14*     (2009.01)

(52) U.S. Cl.
    CPC ............ *H04W 88/08* (2013.01); *H04W 88/12* (2013.01); *H04W 88/14* (2013.01)

(56) References Cited

U.S. PATENT DOCUMENTS

| | | | | |
|---|---|---|---|---|
| 2013/0294403 | A1* | 11/2013 | Srinivasan | H04W 36/165 370/331 |
| 2014/0362775 | A1* | 12/2014 | Steiner | G06F 9/45558 370/329 |
| 2015/0110095 | A1* | 4/2015 | Tan | H04W 40/02 370/338 |
| 2016/0112945 | A1* | 4/2016 | Chen | H04W 28/085 370/338 |

OTHER PUBLICATIONS

T. Blajic et al., "Latency Improvements in 3G Long Term Evolution", Mobile Solutions, Ericsson Nikola Tesla d.d., Zagreb, Croatia, 6 pages.
Per Beming et al., "LTE-SAE architecture and performance", Ericsson Review No. 3, 2007, Downloaded at http://www.ericsson.com/ericsson/corpinfo/publications/review/2007_03/files/5_LTE_SAE.pdf, 7 pages.
Architecture Overview, NCHU CSE LTE, Downloaded at http://wcclab.cs.nchu.edu.tw/www/images/Wireless_Broadband_Networks_102_1/ch8.pdf, 33 pages.
ETSI GS NFV 001 v1.1.1 (Oct. 2013); "Network Functions Virtualisation (NFV); Use Cases"; 50 pages.
Xin Jin, et al.; "SoftCell: Taking Control of Cellular Core Networks"; XP-002719715; pp. 1-14.
European Search Report application No. 15171340.1 dated Nov. 12, 2015.
European Examination Report issued in corresponding European Application No. 15 171 340.1 dated Jul. 21, 2017.
3GPP TS 36.300 V12.1.0 (Mar. 2014) Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 12); 36300-C10, Mobile Competence Centre; 650, Route Des Lucioles; F-06921 Sophia-Antipolis Cedex, France, Mar. 19, 2014, XP050816510.
Summons to attend Oral Proceedings pursuant to Rule 115(1) EPC dated Jul. 12, 2018 corresponding to European Patent Application No. 15171340.1.
Christoforos Kachris et al., "A Survey on Optical Interconnects for Data Centers," IEEE Communications Surveys & Tutorials, vol. 14, No. 4, Fourth Quarter 2012, Oct. 1, 2012, pp. 1021-1036, XP011471439.
Andrew Walker et al., "Design and Construction of an Optoelectronic Crossbar Switch Containing a Terabit per Second Free-Space Optical Interconnect," IEEE Journal of Selected Topics in Quantum Electronics, vol. 5, No. 2, Mar./Apr. 1999, Apr. 1, 1999, pp. 236-249, XP011062506.
Partha Pratim Pande et al., "Design of a Switch for Network on Chip Applications," Proceedings of the 2003 International Symposium on Circuits and Systems, 2003. ISCAS 2003, IEEE, vol. 5, May 1, 2003, pp. V-217-V-220, XP002320369.
NGMN, "Suggestions on Potential Solutions to C-RAN," By NGMN Alliance, Internet Citation, Jan. 3, 2013, version 4.0, pp. 1-41, XP002759072.
Bernd Haberland et al., "Radio Base Statiosn in the Cloud," Bell Labs Technical Journal, vol. 18, No. 1, Jun. 30, 2013, pp. 129-152, XP055098994.
Cheng Liu et al., "The Case for Re-configurable Backhaul in Cloud-RAN based Small Cell Networks," INFOCOM, 2013 Proceedings IEEE, IEEE, Apr. 14, 2013, pp. 1124-1132, XP032440862.
Wikipedia page "Library (computing)," Dating maintenance tags; May 9, 2014, pp. 1-11.

* cited by examiner

ARCHITECTURE FOR RADIO ACCESS NETWORK AND EVOLVED PACKET CORE

BACKGROUND

Field

As radio access network (RAN) architecture evolves towards cloud RAN (C-RAN) deployments, and evolved packet core (EPC) deployments get more distributed to capitalize on local breakout/content delivery, there is an opportunity to provide significant optimizations of latency and processing. Certain embodiments can provide these and other benefits using vertical aggregation of radio access network and evolved packet core functionalities.

Description of the Related Art

Conventional networks have evolved Node Bs (eNBs) distributed at the cell sites and network elements such as a mobility management entity (MME), serving gateway (SGW), and/or packet data network (PDN) gateway (PGW) centralized at regional, or even national, centers.

As RAN evolves towards C-RAN, baseband RAN may be aggregated at a larger scale. At the same time, operators of RANs may be interested in more distributed EPCs, to enable local breakout/content delivery, reduction in signaling latencies, and the like.

In conventional protocol stacks in RAN and EPC there are several intermediary interfaces and protocol layers. For example, on the control plane there is interface S1, which is stream control transmission protocol (SCTP)-based, and interface S11, which is general packet radio service (GPRS) tunneling protocol (GTP)-c/user datagram protocol (UDP) based, among other interfaces. On the user plane, there are a series of GTP tunnels from the PGW to the SGW and from the SGW to the eNB.

These protocols may in some cases fragment and duplicate of information. For example, on the control plane, part of the user equipment's (UE's) context is at a radio resource control (RRC) layer and part at a network access stratum (NAS) layer, with S1 as an intermediary.

SUMMARY

According to certain embodiments, an apparatus can include at least processor and at least one memory including computer program code. The at least one memory and the computer program code can be configured to, with the at least one processor, cause the apparatus at least to operate as a first control plane entity. The first control plane entity can be a per-user-equipment control plane entity operating on the contexts of a set of users. The at least one memory and the computer program code can also be configured to, with the at least one processor, cause the apparatus at least to operate as a first user plane entity. The first user plane entity can be a per-user-equipment user plane entity operating on the contexts of a set of users. The at least one memory and the computer program code can further be configured to, with the at least one processor, cause the apparatus at least to operate as a second user plane entity. The at least one memory and the computer program code can additionally be configured to, with the at least one processor, cause the apparatus at least to operate as a per-cell control plane entity. The per-user-equipment control plane entity, the first user plane entity, the second user plane entity, and the per-cell control plane entity are operational interconnected via interfaces.

In certain embodiments, an apparatus can include means for operating a network element as a per-user-equipment control plane entity. The apparatus can also include means for operating the network element as a first user plane entity. The first user plane entity can be a per-user-equipment user plane entity. The apparatus can additionally include means for operating the network element as a second user plane entity. The apparatus can also include means for operating the network element as a per-cell control plane entity. The apparatus can further include means for operationally interconnecting the per-user-equipment control plane entity, the first user plane entity, the second user plane entity, and the per-cell control plane entity via interfaces.

A method, according to certain embodiments, can include operating a network element as a per-user-equipment control plane entity. The method can also include operating the network element as a first user plane entity. The first user plane entity can be a per-user-equipment user plane entity. The method can further include operating the network element as a second user plane entity. The method can additionally include operating the network element as a per-cell control plane entity. The method can also include operationally interconnecting the per-user-equipment control plane entity, the first user plane entity, the second user plane entity, and the per-cell control plane entity via interfaces.

A non-transitory computer-readable medium can, according to certain embodiments, be encoded with instructions that, when executed in hardware, perform a process. The process can include operating a network element as a per-user-equipment control plane entity. The process can also include operating the network element as a first user plane entity. The first user plane entity can be a per-user-equipment user plane entity. The process can further include operating the network element as a second user plane entity. The process can additionally include operating the network element as a per-cell control plane entity. The process can also include operationally interconnecting the per-user-equipment control plane entity, the first user plane entity, the second user plane entity, and the per-cell control plane entity via interfaces.

BRIEF DESCRIPTION OF THE DRAWINGS

For proper understanding of the invention, reference should be made to the accompanying drawings, wherein.

DETAILED DESCRIPTION

When baseband RAN is aggregated and EPC is more distributed, RAN and EPC functions can be collocated. Certain embodiments provide architectural enhancements for the scenario where RAN and EPC can be collocated, to enable such things as, for example, reduction in total processing and/or reduction in signaling latencies. More particularly, certain embodiments merge some of the mobility management entity (MME) and eNB C-plane functions into one logical entity.

More particularly, certain embodiments provide vertical aggregation in which protocol stacks across RAN and core are collapsed to eliminate intermediary protocols.

As mentioned above, in conventional protocol stacks in RAN and EPC there are several intermediary interfaces and protocol layers. These protocols can fragment and duplicate of information.

Vertical aggregation can refer to collapsing multiple functional layers to eliminate intermediary protocols between the layers. Applied when RAN and EPC are collocated, vertical aggregation can permit inline processing of certain RAN and EPC functions without requiring intermediary protocols like S1. Thus a single processing instance can perform certain RAN as well as certain EPC functions on user contexts when vertical aggregation is used. An alternative would be to have different processing elements for RAN and EPC functions, which could then involve an intermediate signaling protocol between the two processing elements. This intermediate signaling can add to latency and processing overhead. With vertical aggregation, this latency and processing overhead is eliminated.

On the control plane, for example, a given UE's RRC processing (the UE-dedicated signaling part), and NAS processing can be hosted on the same instance, for example on the same processor in a pool of processors. Thus, S1 latency in call setups can be eliminated. An alternative may be, for example, to have the user's context processed in portions at different instances, for example performing the RRC processing at one processor and the NAS processing at a different processor, using S1 messaging between the processing layers. This may result in increased latency for the signaling procedures.

Similarly, on the user plane, IP traffic can be provided directly from SGi (SGi can refer to a reference point between a packet data network gateway and the packet data network) into a first user-plane entity that performs evolved packet core user plane functions as well as radio access network functions such as the Packet Data Convergence Protocol (PDCP) layer, without the need for intermediate GTP tunnels. Tunneling overhead and data-path latency can thus also be eliminated. An alternative, for example, may be the following. In order to process a data packet destined for a given user, the data may have to traverse a series of GTP tunnels between multiple entities, each of which may execute only a part of the processing related to the user's packet. This may result in increased latencies.

Figure 1:
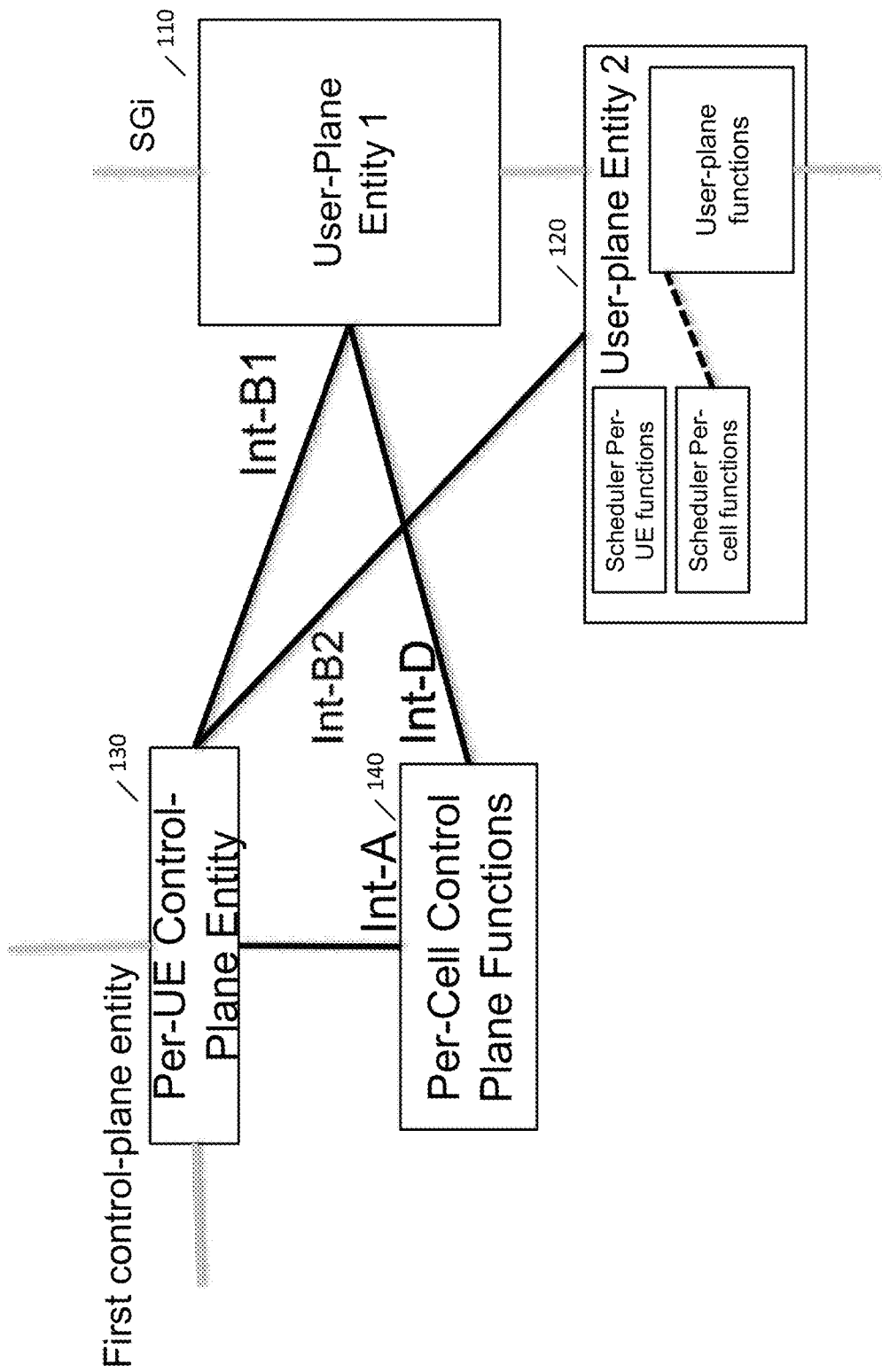
FIG. 1 illustrates a vertically aggregated system architecture providing a new grouping of functions into functional entities, according to certain embodiments.

FIG. 1 illustrates a vertically aggregated system architecture providing a new grouping of functions into functional entities, according to certain embodiments. As shown in FIG. 1, vertical integration can be applied on the control plane as well as on the user plane.

On the user plane, vertical aggregation of time-critical (or time-sensitive) functions can be distinguished from vertical integration of non-time-critical (or non-time-sensitive) functions. Thus there can be user-plane entity 1 110 and user-plane entity 2 120 (also known as a first user plane entity and a second user plane entity), respectively performing non-time-sensitive functions and time-sensitive user plane functions, in a vertically aggregated way. Time-sensitive user-plane functions can include the construction of Medium Access Control (MAC) protocol data units (PDUs) for a given user, which may have to be transmitted to a given user within the deadline of a particular transmission-time interval (TTI) to optimally utilize the air interface. Non-time-sensitive user-plane functions can include evolved packet core functions such as Bearer Mapping, Accounting, Policy Enforcement, and Quality of Service differentiation, as well as radio access network functions such as Packet Data Convergence Protocol (PDCP) comprising ciphering and header compression. These operations typically do not have a strict deadline such as a TTI within which the operation must finish Many of these functions may operate in a way that at any given time, the function accesses the context of one user at a time. For example, when performing an operation on a given packet, it may be sufficient for the function to have access to the context of the user to whom the packet belongs. Such functions may be variously called per-user functions or per-user operations or per-UE functions or the like. In some embodiments, most of the functions in the first user plane entity may be per-UE functions.

On the control plane side, control plane entities that perform per-user functions (e.g. RRC and NAS, paging), such as per-UE control-plane entity 130 (also known as a first control plane entity), can be distinguished from those that perform per-cell functions (e.g. SIB generation, tracking area management), such as per-cell control-plane entity 140. These control plane entities can operate in a manner employing vertical aggregation.

The interfaces between these entities are shown in FIG. 1 as Int-A, Int-B, Int-C, and Int-D. The system interactions can be characterized by the communication over these interfaces.

On the user plane, based on the user's assigned Internet Protocol (IP) address, the user's downlink data packets coming from the internet can be directed by pure IP routing to the correct entity (user-plane entity 1 110) that can perform the non-time-sensitive user plane functions for the user (comprising both evolved packet core functions as well as radio access network functions) in a vertically aggregated way. User-plane entity 1 110 can then forward the downlink data to user-plane entity 2 120 which can handle the time-sensitive user-plane tasks for the user.

Among the time-sensitive functions, Layer-2 functions such as RLC and MAC can be included also possibly with Layer-1 functions such as encoding for downlink and decoding for uplink. Whether the same entity can perform both Layer-1 functions as well as Layer-2 functions may be decided based on various criteria, for example whether a common processor type can be used for both. For example, if both can be performed on a DSP, or both can be performed on an Intel x86 processor, the same entity may perform Layer-1 functions as well as Layer-2 functions. If Layer-1 functions for a user can be performed in the same entity where Layer-2 functions are performed (i.e. vertical aggregation), then, for example, the need for a separate protocol to forward between Layer 2 and Layer 1 will be eliminated. This may result, for example, in a reduction of overhead and latency.

In the downlink direction, the User-Plane Entity 2 120 may forward the data to the cell site/RF head over a front-haul network, which could be fiber-based, Ethernet, wavelength-division-multiplexed, or the like. At the cell-site/Radio head, there may be further functions before transmission from the antennas. These functions may include, for example, Layer-1 functions such as fast Fourier transform (FFT) processing or conversion from baseband to RF frequency, or the like. These functions at the cell site/Radio head may be per-cell functions rather than per-user functions, although per-user functions may also be permitted. The User-Plane Entity 2 120 may be configured to determine which cell a given user belongs to, and thus determine the appropriate path that the downlink data of the user has to follow to reach the appropriate cell site/Radio head.

On the uplink direction, there may be some processing performed at the cell site/RF head. For example, a portion of Layer-1 functions, such as FFT, can be performed at the cell site/Radio head. Following the processing, the data can be delivered to the User Plane Entity 2 for time-critical uplink functions, such as those functions that require decisions on retransmissions or the like.

The time-sensitivity of uplink functions such as Uplink RLC/MAC may be different from the time-criticality of the corresponding downlink functions. Thus, the functional partitioning between User-Plane Entity 1 110 and User-Plane Entity 2 120 for uplink functions may be different from the functional partitioning for downlink functions.

FIG. 1 illustrates a particular functional split for both downlink and uplink, but a different functional partitioning is possible for each direction. Correspondingly, the functional partitioning between the User Plane Entity 2 120 and the cell-site/RF head may also be different between downlink and uplink Decisions on partitioning may be made, for example, depending on cost, complexity, and latency/time-sensitivity.

Certain functions can operate in a "per-UE" (or per-user) manner, while others can operate in a per-cell manner. A per-UE function may, for example, perform operations related to just one user at a time, while a per-cell function may, for example, perform operations or make decisions that take into consideration the totality of a given cell's context or resources or the totality of the users within a given cell. Either per-UE functions or per-cell functions could be control-plane functions or user-plane functions.

An example of a per-UE control plane function can be the processing of dedicated RRC signaling messages. Each message may be sent to or received from a given user. In order to process that message, the context of that particular user may be available to the function, and information about any other user may be unnecessary.

Similarly the processing of Non-Access Stratum (NAS) messages may be a per-user control plane function in some cases. For example, for processing each message, the context of the user to whom or from whom the message is to be sent or received may be sufficient.

In contrast, the processing of broadcast RRC signaling messages, such as system information broadcast or SIB messages, may be, in some cases, a per-cell control-plane function. For processing such messages, access to information about the cell may be useful, and information about any individual user may be unnecessary.

An example of a per-UE user plane function may be the Packet Data Convergence Protocol (PDCP) operation. This function can operate on one packet at a time to perform ciphering and header compression. In order to process a given packet, access to the context (such as ciphering keys or header compression state of the specific bearer) of the individual user to whom that packet belongs may be sufficient, and additional information about any other user may be unnecessary.

Another example of a per-UE function may be the Medium Access Control (MAC) protocol's operation for building the MAC PDUs for a given transmission time interval (TTI). In a given TTI, the MAC may build multiple MAC PDUs. Each MAC PDU may belong to one user, and in order to construct a given MAC PDU, it may be sufficient to access the context (for example, the user's stored data buffer) of that individual user.

Within Layer 2, the radio access network may comprise a scheduler that allocates radio resources between the users based on various criteria such as spectral efficiency and fairness. Scheduler functions can be also distinguished from the rest of the Layer 2 functions, and may be considered a part of a separate functional entity from the rest of Layer 2, without affecting the benefits of vertical aggregation achievable on the user plane. The operations performed by the scheduler may be further distinguished into operations that may perform operations related to one user at a time (called per-user or per-UE functions), and per-cell portions which may make decisions considering the overall population of users in a cell rather than operating one user at a time. Per-UE functions can include, for example, updates of Channel Quality Indicator (CQI) information in a user's context as received on uplink control channels, various user metrics such as throughputs and Quality of Service (QoS) characteristics, and the like. Per-cell portions can include, for example, downlink or uplink frequency-selective scheduling (FSS), allocation for control channel e.g. for Physical Downlink Control Channel (PDCCH), and the like.

When a user connects to the system, for example by performing an RRC connection establishment or a NAS attach procedure or exits from idle mode, a context can be set up for the user in one or more of the functional entities. For example, in an embodiment, a control plane context may be set up for the user in the entity that handles per-UE control plane functions. This context may represent the RRC connection status of the UE, and various attributes of the user such as UE capabilities and security context. In an embodiment, a user plane context may be set up for the UE at the User-plane Entity 1. This may comprise accounting policies to be applied to the UE, or rules to be applied for classification of bearers, or ciphering context for ciphering packets, or buffers within which data destined for the UE may be stored.

For each of the "per-user" processing entities, such as per-user control plane entity, user plane entity 1, or user plane entity 2, there may actually be multiple instances of each entity, for example wherein each instance serves some subset of the users. An instance of an entity may, for example, be a virtual machine running on one or more cores of a multi-core processor. An instance may alternatively be an execution object receiving events or jobs dispatched from an event machine. An instance may alternatively be a processing core running a specific task related to the functions of that entity.

An instance may also comprise an event or a job queue, wherein the queue contains the jobs or events related to a subset of users. In this case, the functional entity may then contain a multiplicity of such queues, and the queues may then dispatch their events or jobs to a pool of processing cores. The dispatch policy could be, for example, any of a load-balancing distribution or in-order/one-at-a-time dispatch. In this view, a user context may be mapped to a queue, while the actual execution of the operations for a given user may occur on any of the processing cores in the pool depending on the policy of dispatching events to cores.

Instances of an entity may not be restricted to serving just users of any given cell, but rather may be designed to handle any user from a plurality of cells. Horizontal aggregation can be applied to such entities. Horizontal aggregation can refer to a configuration in which each instance of a functional entity can serve users from any of multiple cells, and may not be restricted to serve only users from a given cell. For example, each user may be associated with a cell identifier, such as the cell that the user has connected to. User contexts may be mapped to instances of a functional entity. With horizontal aggregation, each instance can serve users from any of multiple cells. Thus an instance can serve one user associated with one cell identifier, and also another user associated with a different cell identifier. Horizontal aggregation can be used to achieve multiplexing or pooling gains across multiple cells. With horizontal aggregation, the operations for the totality of users across all the cells may be distributed in a load-balancing fashion across the multiplicity of instances, of any given functional entity. Horizontal aggregation can be applied, for example, to functional entities whose operation takes place on one user at a time, or on a per-user basis. For example, the PDCP functionality of the radio access network, which can perform ciphering and header compression, may operate on one packet at a time, and for operating on that packet, may only need to refer to the context (e.g. encryption keys, or header compression state) of the user to which the packet belongs regardless of which cell the user belongs to. This can apply to all of the user-plane functions mentioned above for user-plane entity 1, and many of the functions of the user plane entity 2. Due to this property, such functional entities can be structured in the form of multiple processing instances, wherein each instance performs functions for one user at a time, and it does not matter which cell the user belongs to. That is, horizontal aggregation can be applied to such functional entities.

The number of instances of each entity can further be adjusted in a time-varying manner, for example according to the load experienced due to the functions performed by that entity. As the load varies over time, the number of instances can also be changed dynamically over time so as to ensure appropriate processing capacity. Such a dynamic change in the number of instances can be referred to as elastic scaling, and may help to dynamically adapt the processing capacity to the needs of the workload. Elastic scaling can be applied for functional entities performing per-user operations (either control plane or user plane), such as those operating in horizontal aggregation fashion. When the load increases such that the existing number of instances is not adequate to meet the processing needs of the workload, an additional instance can be created dynamically through elastic scaling. Since this new instance also (e.g. due to horizontal aggregation) can serve any user from any cell, it can naturally absorb some of the load from the existing instances, and thus provide a graceful scaling for the system. For each of the functional entities performing per-user functions, one can thus apply horizontal aggregation and elastic scaling to get the most performance benefits in terms of processing power required. Correspondingly, elastic scaling may also comprise dynamically decreasing the number of instances of a given functional entity, for example when the workload decreases. Accordingly, to improve scalability of the network, certain embodiments provide means to facilitate using multiple and time-varying instances of various entities in the network using horizontal aggregation of user contexts. In some embodiments, a measure of the load experienced by the functional entity may be monitored. For example, the measure of load may be the packets processed per unit time, or the bit-rate of the incoming traffic, or the number of users, or the number of packets waiting in queues, or the average processor utilization, or the like. These measures of load may be suitable for functions that are not time-sensitive, such as PDCP. For other functions, other measures of load may be used, such as the average time remaining until a deadline when the current processing is completed. Such measures may be appropriate for time-sensitive functions such as MAC or scheduler. In some embodiments, the monitored measure of load may be reported to a scaling agent, which may also combine the measurements with other criteria or policies to determine when and how the number of instances should be modified. In some instances, once it has been determined to modify the number of instances, commands may be communicated to the appropriate processing entities to initiate creation or deletion of instances.

When horizontal aggregation and elastic scaling are used, the interfaces between the entities can be configured to support the possibility that there are multiple and possibly time-varying number of processing instances of each entity. Such configuration can include, for example, the following. When a user attaches to the system or performs an RRC connection establishment, a context can be set up for the user in each of the functional entities (for example, a control plane context and/or a user plane context). For example, for each functional entity, the user context can be mapped or assigned to one processing instance among multiple instances of that entity. The assignment could be based on various criteria such as load-balancing.

In such a setup, each entity may benefit from knowing which instances of the other entities have a context for a given user, and this may be provided by the interfaces between the entities. Thus each of the interfaces involving a given per-user functional entity can support providing an identifier of the instance of the functional entity that holds the context of the given user. This identifier can be provided to other functional entities that may need to interact with the given functional entity regarding the operations for that user. The interactions may be, for example, for forwarding the data for a given user, or for performing control-plane signaling related to the user.

When there are multiple processing instances of a given entity, the processing of a given user may be handled by different entities for the uplink and downlink directions. Additionally, the uplink and downlink loads on the system may be different. With elastic scaling, the number of uplink processing instances may scale differently from the number of downlink processing instances.

In some cases, the traffic flow may originate at one user and terminate at a different user, but the users are both in nearby cells served by the same instances of the various entities, such as a user-to-user voice call in local area. In this case, the processing of the source and target users may be handled at the same processing instance, avoiding the need of multiple processing hops. Thus, the connection and bearer establishment process for both source and target users may be handled simultaneously at the same processing instance of the per-UE control plane entity, and for example encryption and decryption of the users' traffic may be handled at the same instance of User-Plane Entity 2. Further, the accounting operation which counts how many bytes or minutes have been used by the user may be performed simultaneously at the same processing instance for both the source and target user.

The interfaces illustrated in FIG. 1, Int-A, Int-B1, Int-B2, and Int-D, can be understood as follows. Int-A can be a signaling interface between the Per-UE Control Plane Functions Entity and the Per-Cell Control-Plane Functions Entity. This interface can be used by the Per-UE Control Plane Entity for determining the tracking area structure for a given user by querying the Per-Cell Control Plane Entity. Another exemplifying use of this interface relates to the delivery of system information broadcast (SIB) messages to the users. SIB messages can contain cell-level information relating to various transmission parameters of the cell. In cases where these cell-level broadcast messages such as system information broadcast-1 (SIB1) cannot be delivered to certain users because of their radio channel conditions, the Per-Cell Control Plane Entity can use this interface to deliver the broadcast cell-level messages, such as SIB1, to the Per-UE Control Plane Entity. In turn, the Per-UE Control Plane Entity can then deliver them to the user equipments (UEs) by dedicated (per-UE) RRC signaling. As mentioned earlier, the per-cell entity may obtain an identifier of the instance which handles the RRC signaling for a given user which is in need of such delivery through dedicated per-UE signaling.

Int-B1 can be a signaling interface between the Per-UE Control Plane Entity and the User-Plane Entity 1, which performs non-time-critical per-UE user-plane functions. This interface can be used by the Per-UE Control Plane Entity to inform the Per-UE User Plane Entity 1 when user contexts and bearer contexts are set up, to provide the user's context information related to non-time-critical functions. For example, after the Per-UE Control Plane Entity performs RRC or NAS signaling with a UE to establish a user or bearer or security context, the Per-UE Control Plane Entity can provide the relevant user/bearer/security context parameters to the User Plane Entity 1. The User Plane Entity 1 can then use the provided user/bearer/security context information in performing functions such as bearer mapping, accounting, policy enforcement/QoS, and PDCP including Ciphering and/or Header Compression.

When Horizontal Aggregation is applied to User-Plane Entity 1, a particular processing instance can be selected to handle the processing for a given user. In this case, the Int-B1 Interface may support functions to help Per-User Control Plane Entity select an appropriate processing instance of User-Plane Entity 1, such as providing load information related to the different processing instances of User-Plane Entity 1 to facilitate load-balancing.

Int-B1 may also support functionality to help the Per-UE Control Plane Entity determine the IP address to which the data for a given user should be routed, depending on the processing instance of the User-Plane Entity 1 that is selected. When elastic scaling is applied to the User-Plane Entity 1, the number of processing instances of User Plane Entity 1 may change over time. In this case, Int-B1 may support a registration or announcement protocol that allows a new processing instance of the User-Plane Entity 1 to make Per-UE Control Plane instances aware of its presence.

Int-B1 can also be used by the User-Plane Entity 1, which can perform an idle mode buffering function, to notify the Per-UE Control Plane Entity of the arrival of new data for a user in idle mode, in order to initiate Paging for such UEs. If Horizontal Aggregation or Elastic Scaling is applied to the Per-UE Control Plane Entity, there may be multiple instances of the Per-UE Control Plane Entity. In this case the Int-B1 interface may support a discovery functionality that lets a processing instance of User-Plane Entity 1 discover which particular processing instance of Per-UE Control Plane Entity has the context for the user for whom data has arrived while in idle mode.

Int-B2 can be a signaling interface between the Per-UE Control Plane Entity and the User-Plane Entity 2, which can perform time-critical per-UE user-plane functions such as RLC/MAC. This interface can be used by the Per-UE Control Plane Entity to inform the Per-UE User Plane Entity 1 when user contexts and bearer contexts are set up, to provide the user's context information related to time-critical functions. This may include, for example, information about the retransmission mode, which may be acknowledged or unacknowledged. The information may also include the maximum transport block size supported by the user, and other such information. As with Int-B1, when Horizontal Aggregation and/or Elastic Scaling are applied to either the Per-UE Control Plane Entity or the User-Plane Entity 2, the Int-B2 may support instance discovery/registration/announcement, load-related information to facilitate load-balancing among instances, and user context discovery functionality.

Int-D can be a signaling interface between Per-Cell Control Plane Functions and User-Plane Entity 1. This interface can be configured to support, for example, notifications of System Information Block (SIB) messages to the PDCP layer.

Figure 2:
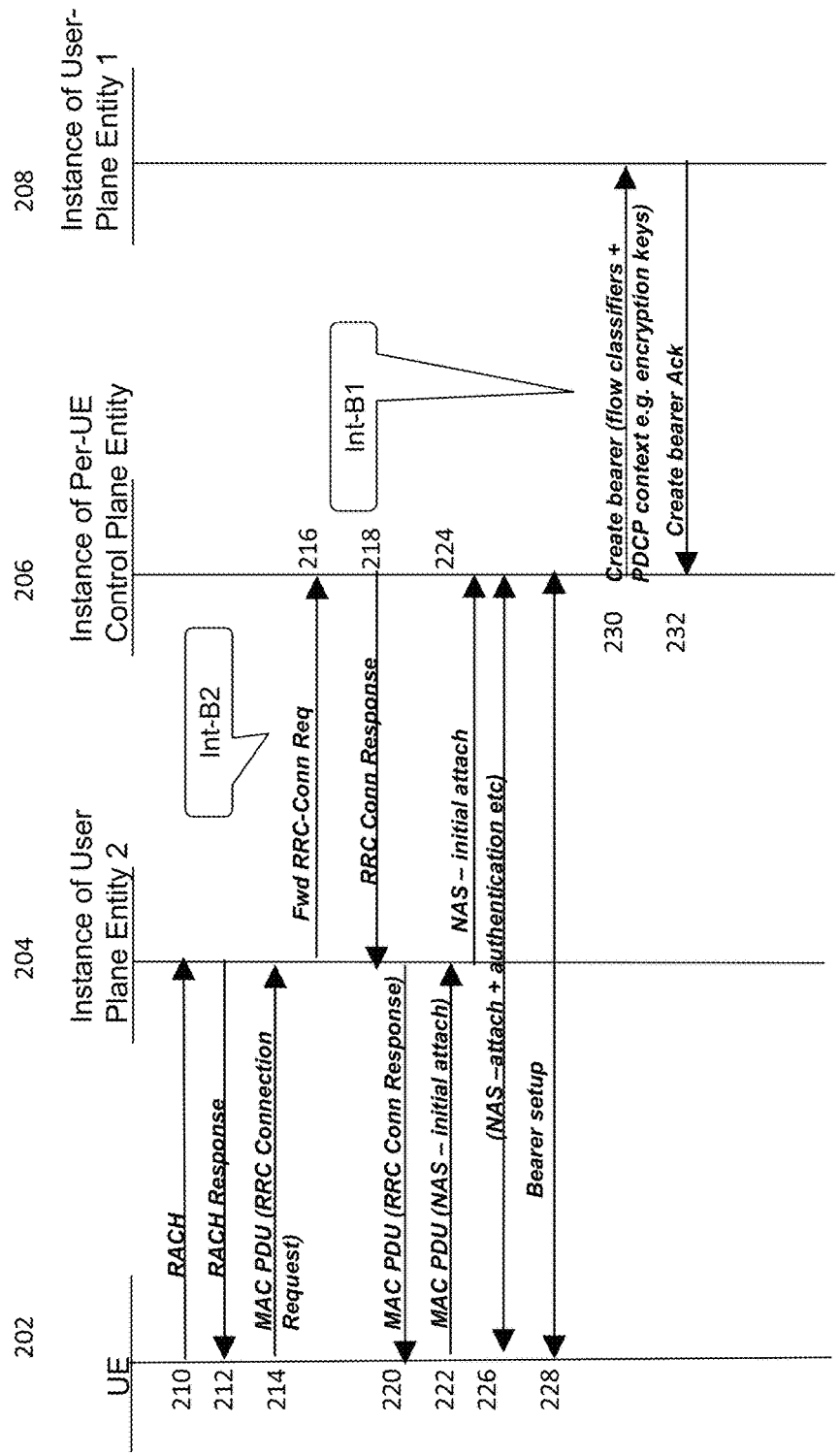
FIG. 2 illustrates interactions for radio resource control (RRC) connection establishment over interfaces according to certain embodiments.

Benefits of vertical aggregation in such an architecture can be visualized when looking at the interactions across these interfaces between the above entities for specific procedures such as RRC connection establishment and paging. FIG. 2 illustrates interactions for RRC connection establishment over interfaces according to certain embodiments. The interfaces and entities involved are denoted in the picture below. The places where latency savings can be obtained are also indicated.

As shown in FIG. 2, at 210 user equipment (UE) 202 can send a message on a random access channel (RACH) and can receive, at 212, a RACH response from an instance 204, which can be an instance of a user plane entity 2. In some embodiments, there may be multiple instances of user plane entity 2. In such cases, the RACH message processing and RACH response may be suitably handled by one of the instances, for example based on load-balancing. UE 202 can then, at 214, send an RRC connection request in a MAC PDU to the instance 204. In turn, the instance 204 can, at 216, forward the RRC connection request over interface Int-B2 to an instance 206, which can be an instance of the Per-UE Control Plane Entity. In some embodiments, there may be multiple instance of the per-UE control plane entity. In such cases the RRC connection request may be sent to one of the instances, for example based on load-balancing. Step 214 may cause setting up of the user context at the per-UE Control Plane Entity. In some embodiments, multiple instances of the per-UE control plane entity may have access to the user context. In other embodiments, the context may be mapped to a particular instance of the per-UE control plane entity.

The instance 206 can respond, at 218, with an RRC connection response, which can be received by instance 204 and forward to UE 202 at 220, in a MAC PDU. Step 218 may cause setting up of user context for the user in user plane entity 2. In some embodiments there may be multiple instances of user plane entity 2. In some cases any of these embodiments may be able to access the user context for further processing, while in other cases the user context may be mapped to one of the instances.

At 222, UE 202 can send a NAS initial attach message in a MAC PDU to instance 204. The instance 204 can, at 224, send the NAS initial attach message to instance 206. In some embodiments where there are multiple instances of the per-UE control plane entity and the user context is mapped to one of the instances, instance 204 may first need to discover an identifier of the instance 206 to which the user's context is mapped, before being able to send the NAS initial attach message to that instance. This discovery may be supported over interface Int-B2. The reception of this message at the instance 206 may cause an update in the user context or setting up of further user context for the user. In response, at 226 instance 206 can send NAS attach and authentication information (possibly in separate messages) and the like to UE 202. In addition, at 228 instance 206 can send bearer setup information to UE 202. At 224, 226, and 228, S1 latency and overhead, for example, can be avoided.

At 230, instance 206 can send a create bearer message, including flow classifiers and PDCP context such as encryption keys, to an instance 208, which can be an instance of a user-plane entity 1, over interface Int-B1. In cases where there are multiple instances of user plane entity 1, the create bearer message may be directed to one of the instances 208, for example based on load-balancing. The reception of the create bearer message can cause setting up of the user context at the user plane entity 1. The instance 208 can acknowledge the create bearer request at 232. For example, GTP tunnel establishment latency and overhead can be avoided at 230 and 232. Both instance 206 and instance 208 can be vertically aggregated functions.

Figure 3:
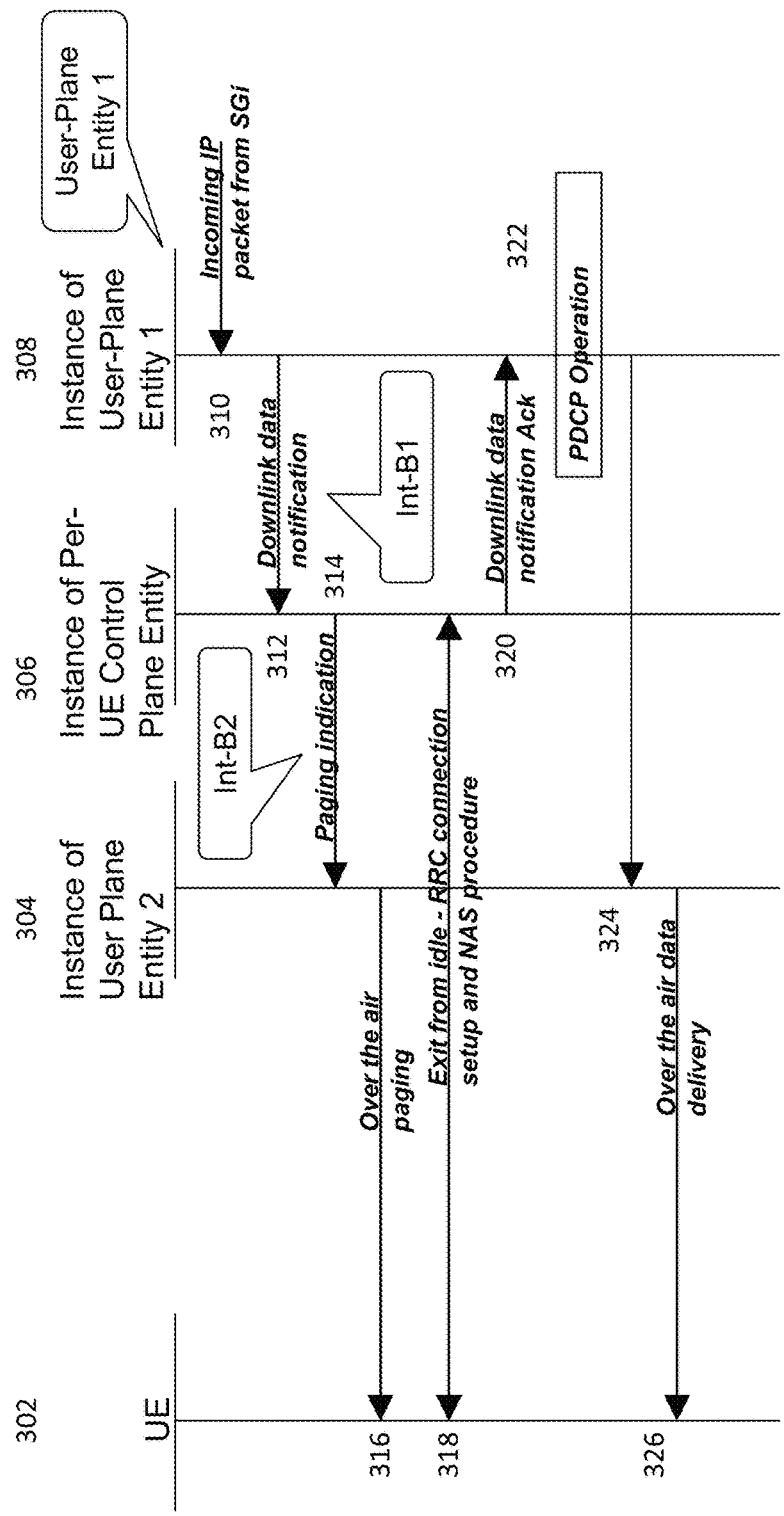
FIG. 3 illustrates a paging procedure according to certain embodiments.

FIG. 3 illustrates a paging procedure according to certain embodiments. Again, the entities and interfaces involved, as well as the places where latency optimization results are illustrated.

As shown in FIG. 3, at 310, instance 308, which can be an instance of a user plane entity 1, can receive an incoming IP packet from the SGi interface. Consequently instance 308 can, at 312, send a downlink data notification to instance 306, which can be an instance of a per-UE control plane entity, over interface Int-B1. This downlink data notification may incur less delay, because PGW-SGW tunneling latency or overhead can be avoided.

At 314, instance 306 can send a paging indication over interface Int-B2 to instance 304, which can be an instance of a user plane entity 2. Instance 304 can then initiate transmission over-the-air of paging messages to UE 302 at 316. Subsequently, at 318, UE 302 can exit from idle mode and setup an RRC connection and perform a NAS procedure to connect to the network with instance 306. Due to RRC-NAS collapsing there may be no overhead of S1 and lower call setup latency and overhead, for example.

At 320, instance 306 may send a downlink data notification acknowledgment to instance 308. For example, there may be no GTP tunnel establishment latency or overhead at this step. Instance 308 can perform PDCP operation (such as ciphering and header compression) at 322 and forward the data to instance 304 at 324. At 326, instance 304 can provide over-the-air data delivery to UE 302.

In some embodiments, downlink data notification/Ack messages can be based on GTP-C messages. In certain embodiments, however, such messages can be simplified, as there may be no need for full GTP-C.

In some embodiments, the per-UE control plane entity can be comprised of multiple instances. In some embodiments, the downlink data notification message 312 may be directed to any of the instances, for example by load-balancing between the instances. In some embodiments, any instance of the per-UE control plane entity may be able to process the downlink data notification message, for example by fetching the context of the appropriate UE out of a common database that is shared by multiple instances. In other embodiments, the UE context may be accessible only to a particular instance. In this case, the instance 308 may first need to discover an identifier of the instance of the per-UE control plane entity that has access to the UE's context. This may be the case, for example, when there are multiple instances of the per-UE control plane entity but only one of the instances (or only a subset of the instances) have access to the context of a given user. In some embodiments, this discovery may be facilitated over the interface Int-B1. For example, the discovery may comprise sending a message containing an identifier of the UE over the interface Int-B1, and receiving in response a message containing an identifier of an instance 306 of the per-UE control plane entity that has access to the context of that UE. After discovering the identifier of the appropriate per-UE control plane instance 306 which has access to the UE's context, the instance 308 may then issue the downlink data notification message to the instance 306.

In aggregated deployments, the vertically aggregated RAN and EPC functions can be instantiated in processor-pool/virtualized environments with dynamic scaling. They may also exist together with horizontal aggregation. In certain discussed embodiments, a given UE can be mapped to a specific processing instance, such as virtual machine (VM), thread, or the like, of each function. That selection and/or load balancing can be done as desired.

In brief, since the S1 link for the control plane is collapsed, RRC and NAS functions for a UE, including dedicated signaling, can be run without any intermediate link. This can provide reduction in call setup latency.

Figure 5:
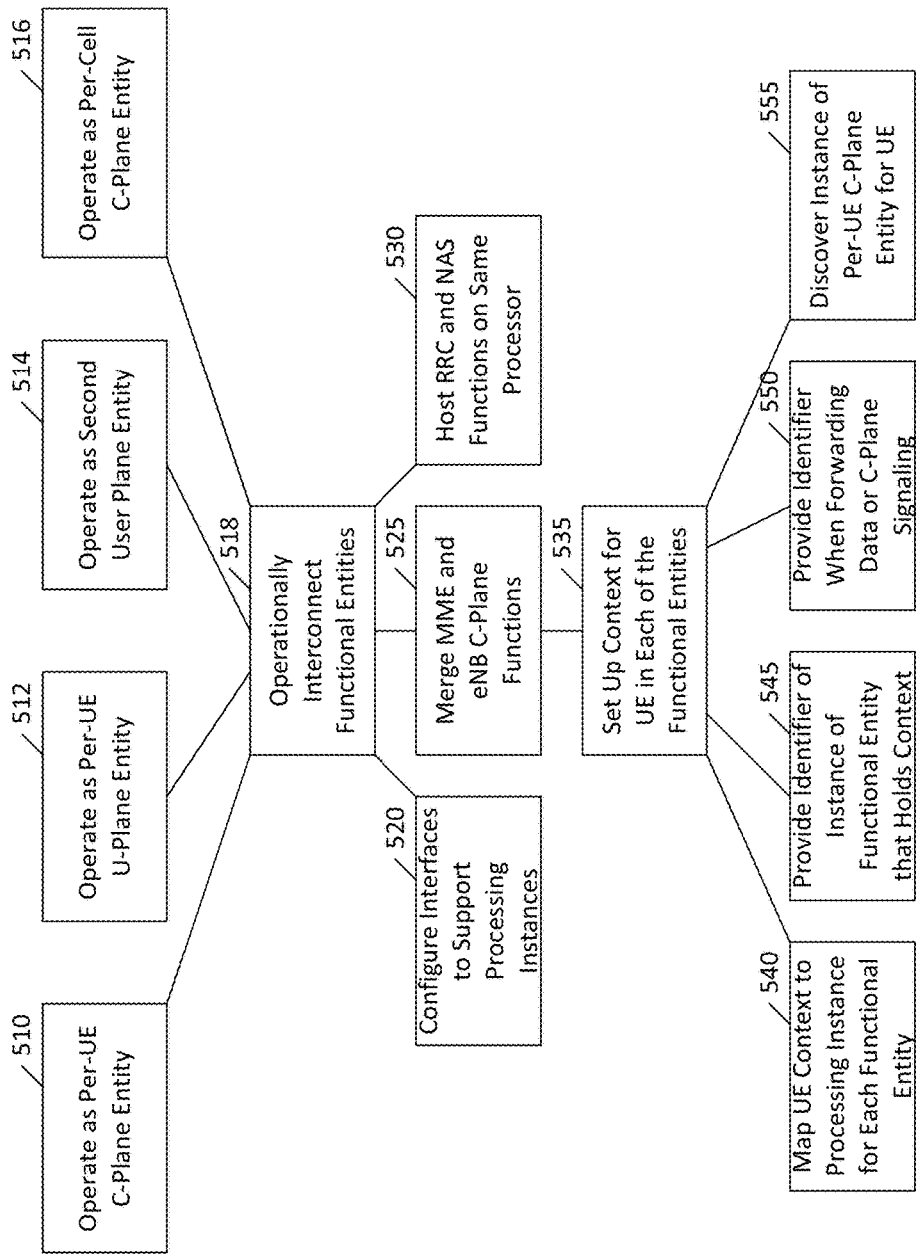
FIG. 5 illustrates a method according to certain embodiments.

FIG. 5 illustrates a method according to certain embodiments. The method of FIG. 5 may be performed by a network element, at least some of whose processing may be virtualized to or distributed across one or more cloud servers. As shown in FIG. 5, the method can include, at 510, operating a network element as a per-user-equipment control plane entity. The method can also include, at 512, operating the network element as a first user plane entity. The first user plane entity can be a per-user-equipment user plane entity. The method can further include, at 514, operating the network element as a second user plane entity. The method can additionally include, at 516, operating the network element as a per-cell control plane entity. The method can also include, at 518, operationally interconnecting the per-user-equipment control plane entity, the first user plane entity, the second user plane entity, and the per-cell control plane entity via interfaces.

The method can also include, at 520, when horizontal aggregation and elastic scaling are used, configuring the interfaces to support multiple and time-varying number of processing instances of each entity. The method can further include, at 525, merging at least some of the MME and eNB C-Plane functions into one logical place.

The method can additionally include, at 530, hosting RRC and NAS functions for a given user equipment on the same processor in the pool of processors. The method can also include, at 535, when a user attaches to the system or performs an RRC connection establishment, setting up a context for the user in each of the functional entities.

The method can further include, at 540, mapping, for each of the functional entities, the user context to one processing instance among a plurality of instances of that entity. The method can additionally include, at 545, providing, by at least one of the per-user-equipment control plane entity, the first user plane entity, and the second user plane entity, over at least one of the interfaces an identifier of at least one instance of the functional entity that holds the context of the given user. The method can also include, at 550, providing the identifier when forwarding the data for a given user between two of the functional entities, or when control-plane signaling related to the user between two of the functional entities. The method can further include, at 555, discovering, by the first user plane entity, which instance of the per-user-equipment control plane entity has the context for a given user for whom data has arrived while in idle mode.

Figure 4:
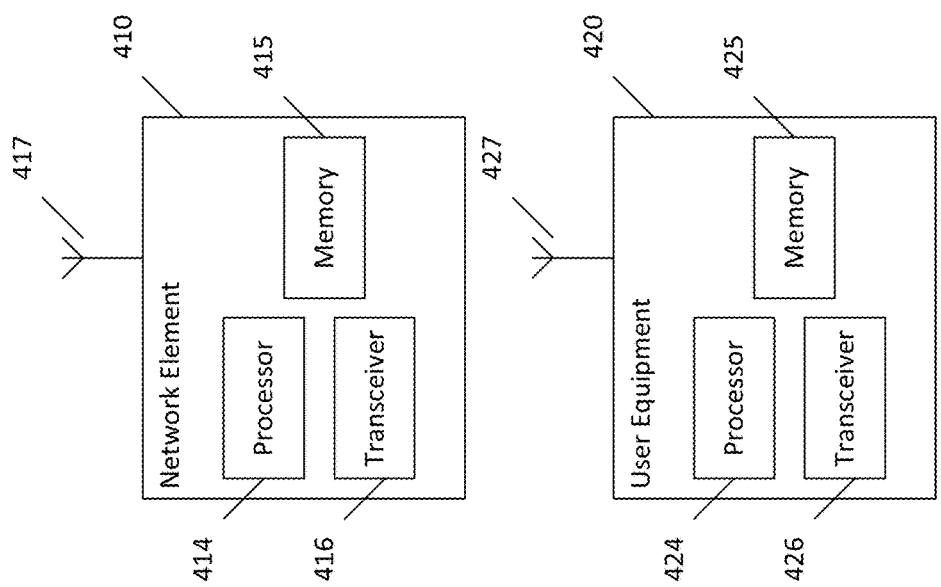
FIG. 4 illustrates a system according to certain embodiments.

FIG. 4 illustrates a system according to certain embodiments of the invention. It should be understood that each block of the flowchart of FIG. 2, 3, or 5, and any combination thereof, may be implemented by various means or their combinations, such as hardware, software, firmware, one or more processors and/or circuitry. In one embodiment, a system may include several devices, such as, for example, network element 410 and user equipment (UE) or user device 420. The system may include more than one UE 420 and more than one network element 410, although only one of each is shown for the purposes of illustration. A network element can be an access point, a base station, an eNode B (eNB), server, host or any of the other network elements discussed herein. Each of these devices may include at least one processor or control unit or module, respectively indicated as 414 and 424. At least one memory may be provided in each device, and indicated as 415 and 425, respectively. The memory may include computer program instructions or computer code contained therein. One or more transceiver 416 and 426 may be provided, and each device may also include an antenna, respectively illustrated as 417 and 427. Although only one antenna each is shown, many antennas and multiple antenna elements may be provided to each of the devices. Other configurations of these devices, for example, may be provided. For example, network element 410 and UE 420 may be additionally configured for wired communication, in addition to wireless communication, and in such a case antennas 417 and 427 may illustrate any form of communication hardware, without being limited to merely an antenna. Likewise, some network element 410 may be solely configured for wired communication, and such cases antenna 417 may illustrate any form of wired communication hardware, such as a network interface card.

Transceivers 416 and 426 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. It should also be appreciated that according to the "liquid" or flexible radio concept, the operations and functionalities may be performed in different entities, such as nodes, hosts or servers, in a flexible manner. In other words, division of labor may vary case by case. One possible use is to make a network element to deliver local content. One or more functionalities may also be implemented as a virtual application that is as software that can run on a server.

A user device or user equipment 420 may be a mobile station (MS) such as a mobile phone or smart phone or multimedia device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof. The user device or user equipment 420 may be a sensor or smart meter, or other device that may usually be configured for a single location.

In an exemplifying embodiment, an apparatus, such as a node or user device, may include means for carrying out embodiments described above in relation to FIG. 2, 3, or 5.

Processors 414 and 424 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors. Additionally, the processors may be implemented as a pool of processors in a local configuration, in a cloud configuration, or in a combination thereof.

For firmware or software, the implementation may include modules or unit of at least one chip set (e.g., procedures, functions, and so on). Memories 415 and 425 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network element 410 and/or UE 420, to perform any of the processes described above (see, for example, FIG. 2, 3, or 5). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments of the invention may be performed entirely in hardware.

Furthermore, although FIG. 4 illustrates a system including a network element 410 and a UE 420, embodiments of the invention may be applicable to other configurations, and configurations involving additional elements, as illustrated and discussed herein. For example, multiple user equipment devices and multiple network elements may be present, or other nodes providing similar functionality, such as nodes that combine the functionality of a user equipment and an access point, such as a relay node.

Certain embodiments may have various benefits and/or advantages. For example, certain embodiments may provide for the elimination of intermediary interfaces and protocols, such as S1, S11, and GTP tunneling, when RAN and EPC can be collocated. Moreover, in certain embodiments there may be a reduction in call-setup latency and in processing overhead.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims

We claim:

1. An apparatus, comprising:
   at least one processor; and
   at least one memory including computer program code,
   wherein the at least one memory and the computer program code are configured to, with the at least one processor, cause the apparatus at least to
   operate as a first control plane entity, which is configured to perform per-user-equipment control-plane functions rather than per-cell control-plane functions;
   interconnect via interfaces to a per-cell control plane entity, which is configured to perform per-cell control-plane functions rather than per-user control-plane functions, and to a first user plane entity, which is configured to perform per-user-equipment user-plane functions;
   configure the interfaces to support multiple and time-varying number of instances of at least one of the first control plane entity, the per-cell control plane entity, and the first user plane entity; and
   collapse protocol stacks across a radio access network and an evolved packet core when the radio access network and the evolved packet core are collocated.

2. The apparatus of claim 1, wherein the at least one memory and the computer program code are configured to, with the at least one processor, cause the apparatus at least to merge at least some of the mobility management entity and evolved Node B control plane functions into one logical place.

3. The apparatus of claim 1, wherein the at least one memory and the computer program code are configured to, with the at least one processor, cause the apparatus at least to map, for each of the functional entities, the context of a user to one instance among a plurality of instances of that entity.

4. The apparatus of claim 1, wherein at least one of the first control plane entity and the first user plane entity, is configured to provide, over at least one of the interfaces, an identifier of at least one instance of the functional entity that operates on the context of a given user.

5. The apparatus of claim 4, wherein the at least one memory and the computer program code are configured to, with the at least one processor, cause the apparatus at least to use the provided identifier for at least one of
   forwarding data for a first user to the first user-plane entity, or
   control-plane signaling related to a first user to the first control plane entity.

6. The apparatus of claim 1, wherein the at least one memory and the computer program code are configured to, with the at least one processor, cause the apparatus at least to discover over at least one of the interfaces, by the first user plane entity, an identifier of the instance of the first control plane entity that operates on the context of a given user for whom data has arrived while in idle mode.

7. The apparatus of claim 1, wherein the at least one memory and the computer program code are configured to, with the at least one processor, cause the apparatus at least to modify a number of instances of either the first control plane entity or the first user plane entity based on a measure of loading of the first control plane entity or the first user plane entity.

8. The apparatus of claim 7, wherein the at least one memory and the computer program code are configured to, with the at least one processor, cause the apparatus at least to, when the number of instances of an entity is modified, use the modified number of instances in mapping the context of a given user to the plurality of instances of said entity.

9. The apparatus of claim 1, wherein the at least one memory and the computer program code are configured to, with the at least one processor, cause the apparatus at least to perform evolved packet core user-plane functions as well as radio access network user-plane functions on the same instance of the first user plane entity, wherein evolved packet core user-plane functions comprise at least one of bearer mapping, accounting, policy enforcement, or quality-of-service differentiation, and wherein radio access network user-plane functions comprise at least one of packet data convergence, radio link control, or medium access control.

10. A method, comprising:
    operating a network element as a first control plane entity, which performs per-user equipment control-plane functions rather than per-cell control-plane functions;
    interconnecting via interfaces to a per-cell control plane entity, which is configured to perform per-cell control-plane functions rather than per-user equipment control-plane functions, and to a first user plane entity, which is configured to perform per-user-equipment user-plane functions;
    configuring the interfaces to support multiple and time-varying number of instances of at least one of the first control plane entity, the per-cell control plane entity, and the first user plane entity; and
    collapsing protocol stacks across a radio access network and an evolved packet core when the radio access network and the evolved packet core are collocated.

11. The method of claim 10, further comprising:
    merging at least some of the mobility management entity and evolved Node B control plane functions into one logical place.

12. The method of claim 10, further comprising:
    hosting radio resource control and non-access stratum functions for a given user equipment on at least one of
    the same instance or
    the same pool of instances
    of the first control plane entity.

13. The method of claim 10, further comprising:
    mapping, for each of the functional entities, the context of a user to one instance among a plurality of instances of that entity.

14. The method of claim 10, further comprising:
    providing, by at least one of the first control plane entity and the first user plane entity over at least one of the interfaces an identifier of at least one instance of the functional entity that operates on the context of a given user.

15. The method of claim 14, further comprising:
    using the provided identifier for at least one of
    forwarding data for a first user to the first user-plane entity, or
    control-plane signaling related to a first user to the first control plane entity.

16. The method of claim 10, further comprising:
    discovering over at least one of the interfaces, by the first user plane entity, an identifier of the instance of the first control plane entity that operates on the context of a given user for whom data has arrived while in idle mode.

17. The method of claim 10, further comprising:
modifying a number of instances of either the first control plane entity or the first user plane entity based on a measure of loading of the first control plane entity or the first user plane entity.

18. The method of claim 17, further comprising:
when the number of instances of an entity is modified, using the modified number of instances in mapping the context of a given user to the plurality of instances of said entity.

19. The method of claim 10, further comprising:
performing evolved packet core user-plane functions as well as radio access network user-plane functions on the same instance of the first user plane entity,
wherein evolved packet core user-plane functions comprise at least one of bearer mapping, accounting, policy enforcement, or quality-of-service differentiation, and
wherein radio access network user-plane functions comprise at least one of packet data convergence, radio link control, or medium access control.

20. A non-transitory computer-readable medium encoded with instructions that, when executed in hardware, perform a process, the process comprising:
operating a network element as a first control plane entity, which performs per-user equipment control-plane functions rather than per-cell control-plane functions;
interconnecting via interfaces to a per-cell control plane entity, which is configured to perform per-cell control-plane functions rather than per-user equipment control-plane functions, and to a first user plane entity, which is configured to perform per-user-equipment user-plane functions;
configuring the interfaces to support multiple and time-varying number of instances of at least one of the first control plane entity, the per-cell control plane entity, and the first user plane entity; and
collapsing protocol stacks across a radio access network and an evolved packet core when the radio access network and the evolved packet core are collocated.

* * * * *